(12) United States Patent
Glimpel et al.

(10) Patent No.: US 9,033,624 B2
(45) Date of Patent: May 19, 2015

(54) SCREW TAP AND METHOD FOR THE PRODUCTION OF A SCREW TAP

(75) Inventors: Helmut Glimpel, Lauf a. d. Pegnitz (DE); Thomas H. Berschneider, Weigendorf (DE); Dietmar G. Hechtle, Pegnitz (DE); Thomas A. Zeus, Hersbruck (DE)

(73) Assignee: EMUGE-WERK RICHARD GLIMPEL GMBH & CO. KG, FABRIK FÜR PRÄZISIONSWERKZEUGE, Lauf a.d. Pegnitz (DE)

( * ) Notice: Subject to any disclaimer, the term of this patent is extended or adjusted under 35 U.S.C. 154(b) by 1027 days.

(21) Appl. No.: 12/747,146

(22) PCT Filed: Dec. 12, 2008

(86) PCT No.: PCT/EP2008/010609
§ 371 (c)(1),
(2), (4) Date: Jun. 30, 2010

(87) PCT Pub. No.: WO2009/074343
PCT Pub. Date: Jun. 18, 2009

(65) Prior Publication Data
US 2010/0260566 A1    Oct. 14, 2010

(30) Foreign Application Priority Data
Dec. 12, 2007   (DE) .......................... 10 2007 060 354

(51) Int. Cl.
*B23G 5/06* (2006.01)

(52) U.S. Cl.
CPC .............. *B23G 5/06* (2013.01); *B23G 2210/28* (2013.01)

(58) Field of Classification Search
USPC ................... 470/198; 408/222, 219, 220, 215
See application file for complete search history.

(56) References Cited

U.S. PATENT DOCUMENTS 1,718,536 A * 6/1929 Dalzen .......................... 408/220
2,556,174 A * 6/1951 Evans ............................. 470/84
(Continued)

FOREIGN PATENT DOCUMENTS

EP      1864736 A2   12/2007
SU      1235673 A1   6/1986
(Continued)

OTHER PUBLICATIONS

English translations of Soviet Uniton Patent No. SU 1235673A issued to Lopukhov.*
(Continued)

*Primary Examiner* — Daniel Howell
*Assistant Examiner* — Chwen-Wei Su
(74) *Attorney, Agent, or Firm* — Workman Nydegger

(57) ABSTRACT

This invention relates to a screw tap which is rotatable about a rotational axis and has a number of thread-cutting teeth, which respectively have a radially outer tip cutter and are disposed mutually offset, with a predefined thread pitch, in an arrangement running spirally or helically around the rotational axis. In a lead region adjoining one end of the screw tap axially to the rotational axis, the maximum radial distance of the tip cutters of the thread-cutting teeth from the rotational axis increases with increasing axial distance of the tip cutters from one end of the screw tap according to a predefined radial distance function. At least some of the thread-cutting teeth in the lead region, at least in the region of the tip cutters, respectively have a defined cutter rounding between tool face and tool flank.

19 Claims, 4 Drawing Sheets

(56) References Cited

U.S. PATENT DOCUMENTS

| | | |
|---|---|---|
| 3,021,538 A | 2/1962 | Linley |
| 6,105,467 A * | 8/2000 | Baker .................. 76/104.1 |
| 7,147,413 B2 | 12/2006 | Henderer |
| 7,147,939 B2 | 12/2006 | Henderer et al. |
| 7,207,867 B2 | 4/2007 | Henderer et al. |
| 2005/0042049 A1 | 2/2005 | Schwarz |
| 2006/0127193 A1* | 6/2006 | Akaki et al. .................. 408/224 |

FOREIGN PATENT DOCUMENTS

| | | |
|---|---|---|
| WO | 2008048853 A2 | 4/2008 |
| WO | 2008048853 A3 | 4/2008 |

OTHER PUBLICATIONS

International Search Report and Opinion, PCTEP2008010609, Mailed Jun. 7, 2010.

* cited by examiner

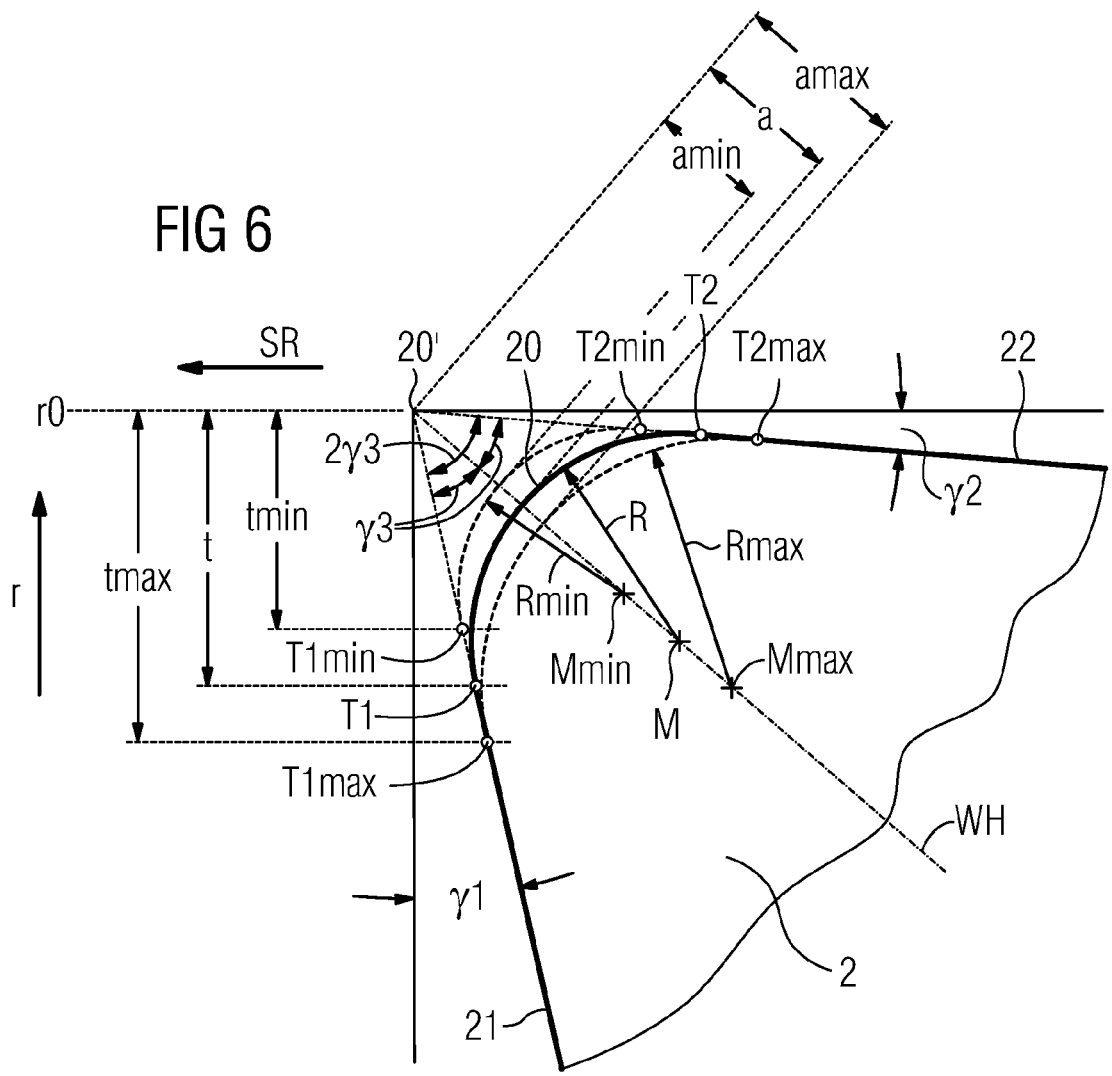

SCREW TAP AND METHOD FOR THE PRODUCTION OF A SCREW TAP

BACKGROUND OF THE INVENTION

1. Field of the Invention

The invention relates to a screw tap and a method for the production of a screw tap.

2. Background and Relevant Art

From the "Handbuch der Gewindetechnik and Frästechnik" ("Manual of Threading Practice and Milling Practice", Publisher: EMUGE-FRANKEN, Publishing House: Publicis Corporate Publishing, Year of Publication: 2004 (ISBN 3-89578-232-7), hereinafter referred to simply as the "EMUGE Manual", in Chapter 8, Pages 181 to 298, various embodiments of screw taps and tapping methods are disclosed.

Screw taps are tools for the cutting production of threads, which at one end can be fastened by a shank in a tool holder or chuck and at the other end have a working region, with thread cutters or thread-cutting teeth for cutting the thread into the workpiece. The thread-cutting teeth are arranged at a distance apart along a spiral or screw line, the pitch of which corresponds to the thread to be produced. In the cross section perpendicular to the cutting direction or to the screw line, the thread-cutting teeth are matched to the thread profile to be produced and therefore have, on the radially outermost tooth tip, outer cutters or tip cutters for the cutting of the thread bottom and, at the side, generally flank cutters for the cutting of thread flanks.

A screw tap generally has a lead region, in which the maximum radial distance of the tip cutters of the thread-cutting teeth increases from the end of the screw tap axially rearward in a linear or stepped manner, and, in addition, a guide region, which axially adjoins the lead region and in which the radial distance of the tip cutters of the thread-cutting teeth initially remains constant and then normally decreases again slightly conically. For the lead region, with respect to its chamfer length, chamfer diameter and chamfer angle, different lead forms are known, the chamfer length being relevant with respect to the length of the threaded holes. According to DIN, there are lead forms A, B, C, D and E, which differ in terms of the number of turns in the lead, the lead region, and in terms of the entering angle. Lead form A has, for instance, six to eight turns in the lead region and an entering angle of about 5°, lead form B a number of from 3.5 to 5.5 turns in the lead region and an entering angle of 8°, and lead form C a number of turns from two to three and an entering angle of 15°.

In screw tapping, the screw tap is rotated about its longitudinal axis as the rotational axis and, at the same time, is moved into the workpiece with a, relative to the rotational axis, axial feed motion, the axial feed rate being dependent on the rotation speed and the pitch. With screw taps, internal threads are produced in pre-machined through-bores or even blind holes or bottom holes, the thread-cutting teeth being continuously in engagement with the workpiece surface (continuous cut). For chip removal, the screw taps generally have chip grooves between adjacent thread-cutting teeth, which chip grooves can run straight or axially to the rotational axis or even spirally in the sense of rotation of the screw tap or oppositely to the sense of rotation. A screw tap can cut only in one cutting direction (clockwise rotation or counterclockwise rotation) and thus produce either only right-hand threads or only left-hand threads. In the cutting operation or screw tapping, the screw tap, when turned into the bore of the workpiece, makes a starting cut up to the engagement of all lead thread-cutting teeth, and the screw tap is then slowed down up to the maximum penetration depth. Once the whole of the thread is cut into the workpiece, the screw tap is turned back out of the produced thread, by reversal of the direction of rotation and of the axial direction of feed, in a rearward motion or return run. In the return run, the cuttings of the follow-up cutter which remain in the bore are sheared off with the land of the screw tap. In the onward rearward motion, the chip root which remains following shearing-off of the chips is further squeezed back into a gap whose size is dependent on the clearance angle of the screw tap. Next, in a further rearward motion, under the effect of the sliding friction, the screw tap is turned wholly out of the workpiece.

As material for the screw tap, in most cases, at least as the cutting material in the cutting part or on the working region, high-speed steels, in particular HSS for normal load or HSS-E for higher load, are used, though PM steels can also be used.

In addition, hard metal screw taps are also known, hard metal being taken to mean sintered or cemented metal carbides, in particular tungsten carbide, where necessary alloyed or mixed with metals or other metal carbides, solid hard metal (SHM) being spoken of in respect of screw taps in which shank and working region consist of hard metal, and tip hard metal (THM) in respect of screw taps in which the cutter part consists of hard metal and the shank of tool steel. Soldered-in, screwed-in or clamped hard metal strips with thread-cutting teeth are also known.

Because of their greater material hardness and higher compressive strength, and their greater temperature stability, hard metal screw taps have advantages over high-speed steel screw taps, for instance, in theory, a higher rotation speed and longer service life. Hard metal screw taps are advantageously used to bore threads in grey cast iron (GCI) or aluminum. However, hard metal screw taps have a relatively short service life in steels, which is normally less than with comparable HSS or HSS-E screw taps. The shorter service lives with hard metal screw taps presumably stem from the fact that the thread cutters, because of the higher brittleness and lower elasticity, as well as lower breaking strength and toughness of hard metal relative to high-speed steel, break or partially tear off or are worn down prematurely.

In order to increase the service lives and reduce the sliding resistance and build-up tendency, screw taps made both of high-speed steel and hard metal are often additionally surface-treated, from simple nitration up to a modern hard material coating, for instance hard chrome plating, coating with chromium nitride, titanium nitride, titanium carbonitride or titanium aluminum nitride.

In U.S. Pat. No. 7,147,939 B2, in order to increase the service life, a hard metal screw tap having a tungsten carbide core is alloyed with cobalt within a range from 14 to 16% by weight and with a wear-resistant coating, provided with a gradient, of metal nitride, carbide, carbon nitride, boride and/or oxide, the metal being aluminum, silicon or a transition metal from one of the periodic system groups IVa, Va and VIa, as well as with an outer coating containing molybdenum disulphide for reducing friction over the wear-resistant coating, is proposed. It is stated that the service life in 33 HRC AISI 4340 steel was higher than with an HSS screw tap conventionally coated with titanium nitride.

In U.S. Pat. No. 7,147,413 B2 and associated U.S. Pat. No. 7,207,867 B2, in order to increase the service life, a hard metal screw tap is proposed, comprising a cylindrical shank and a thread-producing region with a lead region containing a wear-resistant coating of metal nitride, carbide, carbon nitride, boride and/or oxide, the metal being aluminum, silicon or a transition metal of the periodic system groups IVa, Va and VIa and being coated with a further outer coating containing molybdenum disulphide. The cylindrical shank is held, during the grinding, with a hydraulic precision holder, so that the thread-producing region and the lead region are concentric to the cylindrical shank within a tolerance of 10 μm.

In the grinding of screw taps, those cutting edges of the thread-cutting teeth which point in the cutting direction are made as sharp as possible in order to enable a sharp and smooth cut of the thread, or, in other words, to enable roundings on the cutting edges to be kept as small as possible.

In the grinding of high-speed steel screw taps, burrs are now, however, generally formed on the cutting edges, which burrs lead to poor threads at the start of the period of use of the screw tap. It is therefore known, prior to first use of the screw tap, to remove the burrs on the cutters by a deburring operation with brushes or by jet-grinding or jet-machining with abrasive material or with a high pressure water jet. The cutting edges of the high-speed steel screw tap are thereby slightly rounded, however.

In the case of hard metal screw taps, no burr is formed in the grinding of the thread-cutting edges, since hard metal chips differently and has different deformation characteristics than high-speed steel when ground. Nor, therefore, with a hard metal screw tap, is there need for a deburring operation.

If hard material coatings are additionally applied to the material of the screw tap, the cutting edges are likewise rounded off slightly.

A wear-induced distinct rounding is then obtained during use of the screw tap, for which reason screw taps are then also frequently reground in order to recreate sharp cutting edges.

According to the prior art, in screw taps the aforementioned technologically conditioned, yet intrinsically undesirable roundings on the cutting edges are kept as small as possible, typically below a radius of curvature in the order of magnitude of 1 μm to maximally 10 μm. Larger radii of curvature and thus smaller curvatures are regarded by professionals as wear which would render the screw tap unusable.

BRIEF SUMMARY OF THE INVENTION

The object of the invention is now to define a screw tap and a method for the production of a screw tap, in which a good service life of the screw tap is achieved, including when the thread cutters are formed from hard metal.

This object is achieved with respect to the screw tap having the features of the independent patent claim(s), and with respect to the method having the features of recited therein. Advantageous embodiments and refinements emerge from the respectively dependent patent claims.

The invention is now based on the surprising recognition that, with a purposeful and defined rounding (or: rounded-off or rounded shaping or preparation) at least of some of the cutting edges of thread-cutting teeth, at least in the region of the outer cutters or tip cutters, of a screw tap, the service life of a screw tap can be increased relative to the same screw tap without this rounding (or: shaping or preparation), even if the thread-cutting edges consist of hard metal and threads are cut in steel, by choosing the curvature of the cutter rounding and/or the reduction depth (or: material removal depth) of the rounded cutting edge in comparison to the ideal wedge shape (or: to the unrounded cutting edge) in dependence on at least two parameters:
 number of thread-cutting teeth in the lead region and
 thread pitch and preferably also on the third parameter:
 rise or increase in the maximum radial distance of the outer cutters or tip cutters of the thread-cutting teeth (or: of the thread cutters shaped according to the thread profile) over the lead region in accordance with the path of the radial distance function in the lead region.

In an advantageous embodiment, the curvatures of the cutting edge roundings of the thread-cutting teeth in the lead region are here chosen or set, at least on average, larger (or, correspondingly, the radii of curvature smaller), if
 the number of thread-cutting teeth in the lead region is larger, assuming the same radial distance function and/or the same thread pitch,
 the increase in the maximum radial distance over the whole of the lead region according to the radial distance function is smaller, assuming the same number of thread-cutting teeth in the lead region and/or the same thread pitch,
 the thread pitch is smaller, assuming the same radial distance function and/or the same number of thread-cutting teeth in the lead region.

A radial direction is here defined as running perpendicular to the tool axis through this or away from this, and an axial direction is defined as running along or parallel to the tool axis.

The thread pitch can be defined as the axial distance apart of two corresponding points of axially adjacent thread-cutting teeth or interspaces, or also as the pitch or pitch angle of the thread or of the screw line of the arrangement of cutting teeth, for instance according to DIN 2244.

The curvature of the rounded cutter or cutting edge is determined on a line or curve of projection or intersection, the plane of intersection or projection running, in particular, either transversely to the cutting edge or so as to contain the cutting direction and, where necessary, at the pitch angle of the screw line of the arrangement of thread-cutting teeth, or preferably in a plane perpendicular to the rotational axis (in the case of outer or tip cutters) or in a plane parallel to the rotational axis (in the case of flank cutters). The curve of projection or intersection of the rounded cutting edge in the plane of projection or intersection thus runs in a direction between tool face and tool flank.

On such a curve of projection or intersection, the curvature or radius of curvature can thus be measured, for instance by scanning by means of a scanner which is known per se, in order to determine of a cutting edge rounding, the cutting edge being at least partially traversed from tool face to tool flank, or vice versa, and a change of scanner position being evaluated.

That place on the cutting edge at which the plane of projection or intersection runs through or intersects the cutting edge and at which the cutting edge rounding is thus measured or determined can be located at different sites along the cutting edge. A measurement in the middle or center of the tip cutter is preferred. If the flank cutting edges are also rounded, a measuring position is preferably located on the flank diameter or in a central position on the flank cutters. However, a plurality of measuring points can also be provided along the cutting edge and a plurality of radii of curvature or curvatures which have been determined there can be used, or even an average of the plurality of radii of curvature or curvatures which have been determined there can be taken in order to determine an average curvature of this cutting edge or of this cutting edge portion, for instance of the tip cutter.

The curvature of the rounded cutting edge at a measuring point is then obtained from the second derivative of the curve of projection or intersection of the cutting edge in the plane of projection or intersection at this measuring point. The radius of curvature at a point on the cutting edge along the curve of projection or intersection is the radius of the circle of curvature at this point of the cutter, the centerpoint of the circle of curvature is termed as the center of curvature. The circle of curvature and the curved curve of projection of intersection of the rounded cutting edge have at this point the same tangent, or the normal radius vector between the considered point and the center of curvature stands perpendicularly on the tangent to the curve. The radius of curvature is 1 divided by the magnitude of the curvature. If, therefore, the radius of curvature is larger, the curvature is, indirectly proportional thereto, smaller, and vice versa. The radius of curvature, and thus the curvature, is constant only in case of a circular line or circular rounding of the cutting edge, i.e. assumes only a single value there. In the case of all other curved curves or paths, the radius of curvature and the curvature changes along the curve, i.e. is variable and assumes more than one value.

The cutter roundings of the thread-cutting teeth are formed, in particular, with curved cutter profile curves between tool face and tool flank, which run in a plane of projection arranged, in particular, transversely to the cutter or to the tool face and tool flank thereof and/or so as to contain the cutting direction, and where necessary at the pitch angle of the screw line.

In one embodiment, cutter roundings or cutter profile curves are provided, which, at least in sections, are shaped in the form of a circular arc or circular line and which thus exhibit constant curvature.

Cutter roundings or cutter profile curves of variable curvature can also however be provided, wherein the curvature of at least one cutter rounding or of at least one cutter profile curve can increase or decrease from the tool face to the tool flank, or can increase from the tool face to the tool flank up to a maximum, and then decrease again. In addition, in a central region of the tip cutters, the predefined curvature of the cutter rounding can be provided and, in transition regions to the flank regions or cutting edges of the thread-cutting teeth, another curvature, or even an edge shape practically without curvature, can be provided.

Possible at least sectional paths of at least one cutter rounding or of at least one cutter profile curve are predefinable, for instance, by one or more of the following functions: rational or fractionally rational function of the nth degree (such as polynomials or quotients of polynomials), a root or power function, an elliptical function, an exponential function or a logarithmic function, a spiral function, in particular a logarithmic or Archimedean spiral, a cycloid or a function interpolated, in particular, by Lagrangian interpolation polynomials or spline functions.

Technologically, and depending on the production process with which the rounding is produced, the curvature on the individual thread-cutting teeth is also dependent on the considered location on the profile of the thread-cutting tooth and can be smaller (radius of curvature larger) on the tip cutters, for instance, than on the flank cutters, and/or at the transitions between tip cutters and flank cutters can be smaller (radius of curvature larger) than in the tip cutters, and is further dependent on the position of the thread-cutting tooth in the lead region. For instance, the rounding can be more severe, or the curvature of the cutting edges smaller, in thread-cutting teeth which lie radially farther out, i.e. are disposed in that end region of the lead region which lies axially farthest away from the end of the screw tap, than in thread-cutting teeth which lie radially farther in, i.e. are located in the starting region of the lead region which is situated axially adjacent to the end of the screw tap.

In absolute values, according to the invention, radii of curvature of the cutting edge rounding are typically obtained which range from 20 μm to 100 μm, in particular from 25 μm to 60 μm, and thus lie well above the values regarded as maximally permissible under the prior art.

These values can, in particular, constitute maximum values at the respective cutters and also along the cutters become somewhat smaller again. Specifically in the corner regions or transitions between tooth tip and tooth flanks, a smaller curvature or larger-area cutter rounding can also however be realized.

The cutter roundings and, in particular, their radii of curvature, are also dependent on the workpiece material into which the thread is cut, and/or on the material of the thread-cutting teeth of the screw tap.

The radial distance function of the tip cutters in the lead region (or: the axial increase in the maximum radial distance of the tip cutters) is generally monotonically, preferably strictly monotonically growing. By monotonically growing is meant a function which increases at least in sections, or in steps, or even continuously (strictly monotonically), i.e. the function value of the radial distance function for the maximum radial distance of a thread cutter, given a larger axial distance from the end of the screw tap, is always greater than or equal to the function value of a thread cutter, given a smaller axial distance from the end of the screw tap, in the case of a monotonic increase, and always greater than this function value in the case of a strictly monotonic increase.

A preferred radial distance function for the maximum radial distance of the tip cutters is a linear function or even a step function or staircase function of the axial distance from the end of the screw tap. The radial distance function for the maximum radial distance of the tip cutters can also however run in a curved shape and nonlinearly and can be selected, for instance from the group of functions comprising a rational or fractionally rational function of the nth degree, a root or power function, an elliptical function, exponential function or a logarithmic function, a spiral function, in particular a logarithmic or Archimedean spiral, a cycloid or a function interpolated, in particular, by Lagrangian interpolation polynomials or spline functions.

The screw tap preferably consists, at least in the region of the thread-cutting teeth, at least at the tip cutters, of hard metal or metal carbides, or of another, in particular brittle, hard material, in particular polycrystalline diamond (PCD), cubic boron nitride (CBN), corundum, a metal boride, in particular a magnesium boride, or a metal boride carbide, in particular a magnesium boride carbide.

Due to the defined cutter rounding, the forces and loads which act upon the thread-cutting teeth and their cutters, in particular tip cutters, during cutting but, in particular, also in the return run over the chip root, and which, in the case of hard metal, cannot be compensated by an elasticity of the material of the screw tap as well as in the case of high-speed steel, are nevertheless reduced to the point where a marked increase in service life, in particular up to a factor of 10, was able to be established, specifically including in long-chip, tough materials such as steel. The screw tap which is designed in this way can be used in a large number of steels, in particular alloyed steels, case-hardened steels, quenched and tempered steels, nitriding steels, cold or hot working steels, stainless, acid-resistant and/or heat-resistant steels or nickel-based alloys, but also in titanium and titanium alloys, bronzes, wrought or cast aluminum (alloys), cast steel, copper, electrical grade copper, MMCs and other materials, for thread cutting.

BRIEF DESCRIPTION OF THE DRAWINGS

The invention is further explained below with reference to illustrative embodiments. Reference is here made to the drawing, in which, respectively in schematic representation, FIG. 5 shows a diagram for the design of a cutting edge radius and FIG. 6 shows a cutting edge rounded according to the invention, with reduction depth.

Mutually corresponding parts and sizes are provided in FIGS. 1 to 6 with the same reference symbols.

DETAILED DESCRIPTION OF THE PREFERRED EMBODIMENTS

Figure 1:
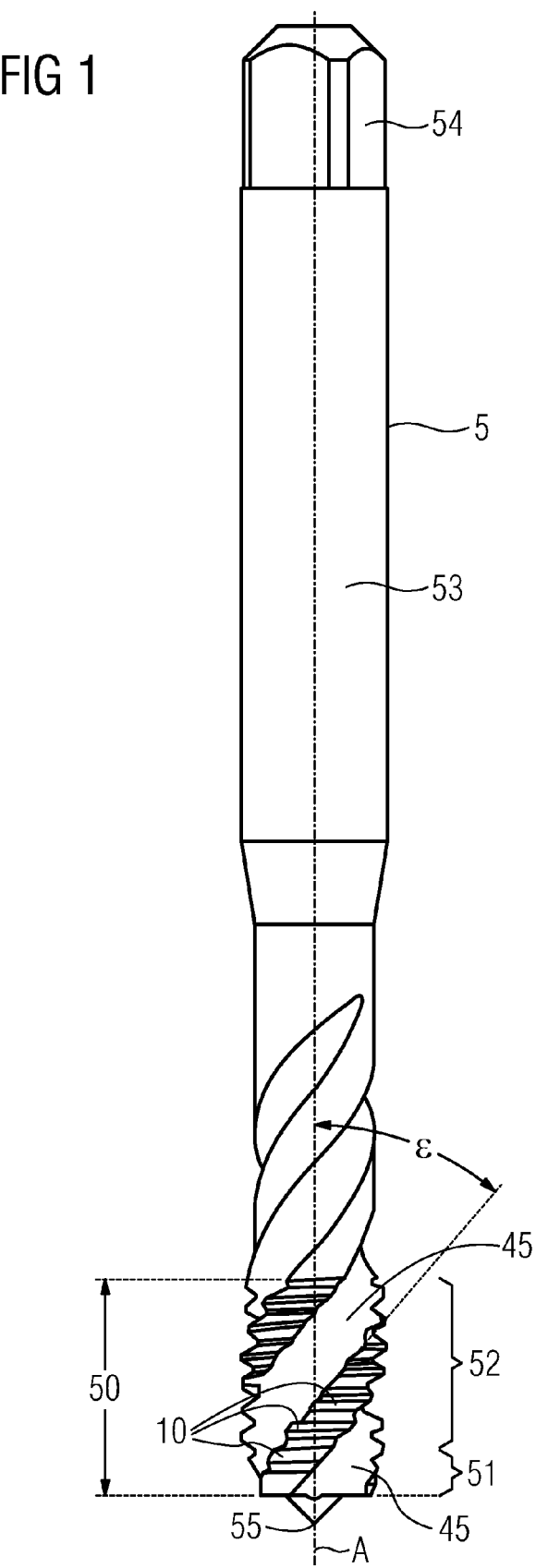
FIG. 1 shows a screw tap in a perspective longitudinal view.
Figure 2:
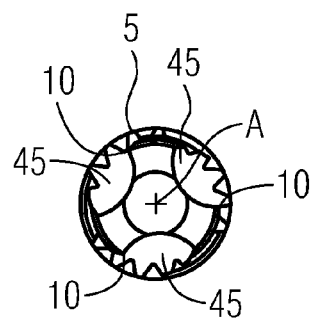
FIG. 2 shows the screw tap according to FIG. 1 in a front view.
Figure 3:
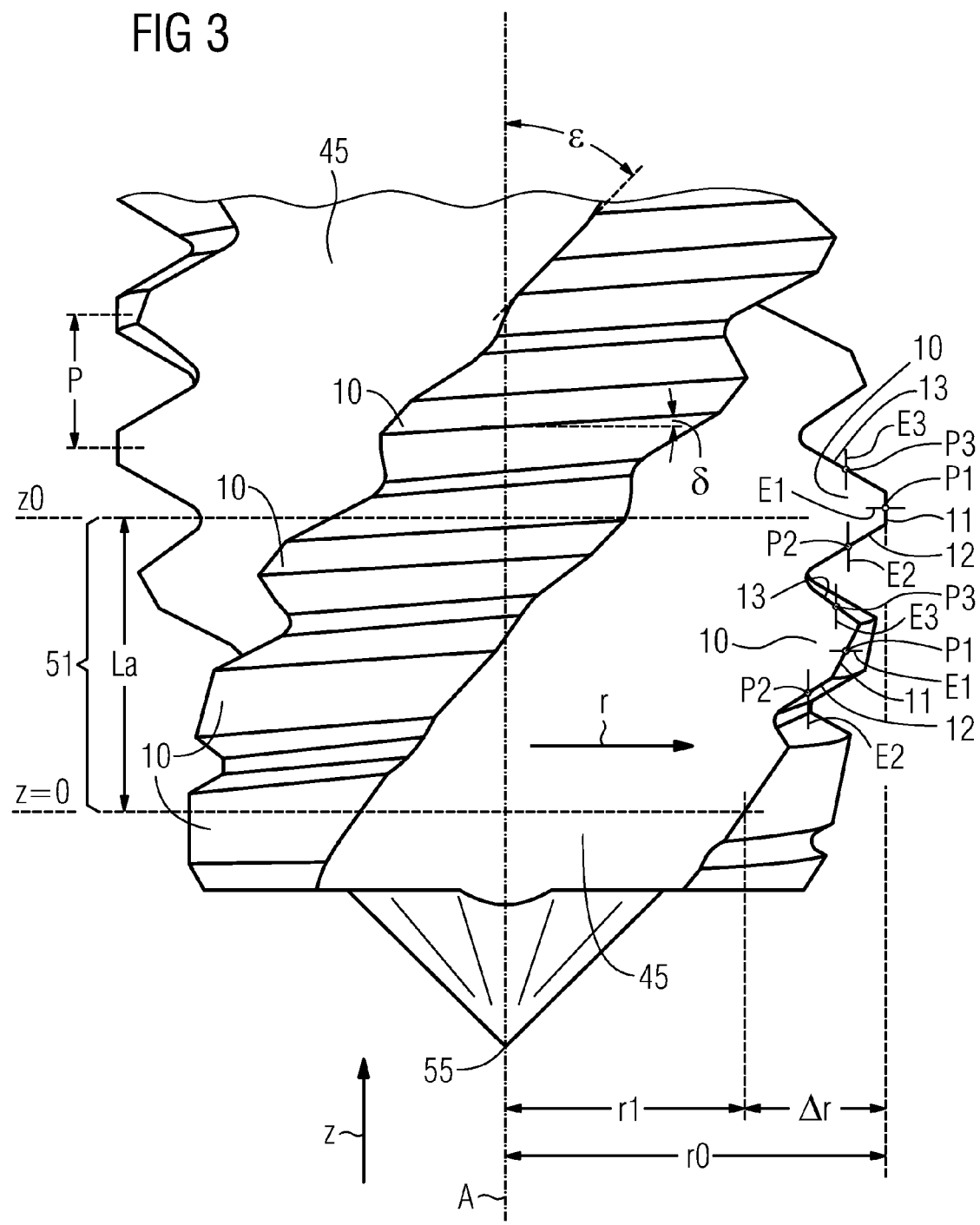
FIG. 3 shows a sub region of the screw tap according to FIG. 1 with the lead region.

The screw tap 5 according to FIGS. 1 to 3 has a shank 53 having a thread-cutting region 50, which adjoins a free end 55, and a square clamping region 54 for positive clamping into a tool holder or chuck and rotation of the screw tap 5 about its rotational axis A. A preferred chuck is a chuck sold by the Applicant under the brand name Softsynchro, or a chuck according to EP 0 887 135 B1.

In the represented illustrative embodiment, the screw tap 5 has in the thread-cutting region 50 three rows of thread-cutting teeth 10, which are respectively arranged at a helix angle or side rake angle ε (see FIGS. 1 and 3) of, for instance, 45° along a chip groove 45 for the evacuation of the chips removed by the thread-cutting teeth 10 in the thread-cutting operation. Two or more than three chip grooves 45 can also, however, be provided. The full set of thread-cutting teeth 10 is disposed along a spiral arrangement with the thread pitch P and at the pitch angle δ (see FIG. 3) of the thread to be produced.

Each thread-cutting tooth 10 has a radial outer tip cutter 11 and inward-running lateral cutters or flank cutters 12 and 13. Thread-cutting teeth 10 for a metric thread are represented by way of example, in the case of other thread types and shapes, e.g. round threads or trapezoidal threads, the thread-cutting teeth being correspondingly adapted in terms of their shape.

An axial coordinate in the axial direction r directed to the rotational axis A away from the free end 55 of the screw tap is denoted by z, and a radial coordinate running thereto or perpendicularly out from the rotational axis, or the radius, is denoted by r. The free end 55, on which, for instance, a centering point is disposed, is axially adjoined, initially, by a region which, when the screw tap engages in the bore or the core hole in the workpiece, does not cut into the workpiece (tolerance zone). From the commencement of a starting cut at the axial value z=0, there now begins a lead region 51, from which the thread-cutting teeth 10 then successively cut into the workpiece, i.e. become active. The radial distance r or the radial distance function r(z) of the tip cutters 11 of the thread-cutting teeth 10 here increases in the direction z axial to the rotational axis A from the commencement of the starting cut at z=0 continuously from a starting radius r1=r(0) at z=0 to a maximum outer radius r0=r(a0) at the axial distance z=z0 at the end of the lead region 51 via the axial chamfer length La=z0−0=z0 of the lead region 51 (see FIG. 3), i.e. by the total difference Δr=r0−r1. The starting radius r1 of the first active thread-cutting tooth here substantially corresponds to the radius of the core hole in which the thread is to be produced.

The thread-cutting teeth 10 in the lead region 51 now respectively machine the thread over a depth which corresponds to the radial distance to the front tooth and is dependent on Δr and the total number Z of teeth in the lead region 51, the so-called lead teeth, further into the workpiece. The total depth of the cut-in thread turn is then Δr.

In the illustrative embodiment represented in FIGS. 1 to 3, the radial distance r is a linear function of the axial coordinate z, so that a conical lead region 51 is realized. The result is that the difference $r_{i+1}-r_i$ or increase in the radial distance r from an ith thread-cutting tooth 10 to the directly adjacent i+1th thread-cutting tooth 10 remains substantially the same over the whole of the lead region 51 at a value of Δr/Z, i.e. each tooth removes roughly a chip of equal width. The function of the radial distance r of the tip cutters 11 from the rotational axis A over the lead region 51 does not, however, have to be a linear function, but can also follow another monotonically growing function over the z-coordinate, so that, for instance, a convexly curved lead region is obtained with an axially increasing or decreasing distance difference $r_{i+1}-r_i$ and thus machining depth or chip thickness.

The chamfer length La and number of thread turns of the thread-cutting region 50 in the lead region 51 is chosen differently with respect to different lead forms, in particular the DIN lead forms A, B, C, D and E mentioned in the introduction being able to be used. Depending on the number of thread-cutting teeth 10 distributed over the periphery, which number generally corresponds to the number of chip grooves 45, a total number Z of lead teeth, i.e. thread-cutting teeth 10 in the lead region 51, is obtained from the number of chip grooves 45 multiplied by the number of thread turns. The number of thread turns in the lead region 51 is in turn dependent on the chamfer length La and the thread pitch P, which corresponds to the axial spacing of two thread-cutting teeth 10 on a chip groove 45 or the axial travel of a thread-cutting tooth after one complete revolution of the screw tap.

In addition, the thread-cutting region 50 has a guide region 52 which adjoins the lead region 51 axially to the rotational axis A and in which the radial distance r of the tip cutters 11 of the thread-cutting teeth 10 remains the same at the outer radius r0, or even slightly decreases again, but no longer increases.

According to the invention, on the tip cutters 11 and preferably also on the flank cutters 12 and 13 of the thread-cutting teeth 10, at least in the lead region 51, preferably also in the guide region 52, a defined rounding is now performed, with which the service life of a screw tap 5 can be increased, in particular of a screw tap made of hard metal or some other brittle hard material when used, in particular, in steels.

As can be seen in greater detail in FIG. 3, the rounding on the tip cutters 11 is measured or determined at a middle or centrally disposed measuring point P1 along the cutter profile from the tool face to the tool flank, or vice versa, in a plane of projection E1, for instance by means of a scanner which is known per se, the plane of projection E1 being directed perpendicular to the cutting edge. Correspondingly, the roundings on the flank cutters 12 and 13 are determined at associated measuring points P2 and P3 by scanning of the cutter profile from tool face to tool flank respectively in a plane of projection E2 and E3 perpendicular to the respective cutting edge. The roundings on the first thread-cutting tooth 10 with full profile are thus preferably determined at the end of the lead region 51 in the transition to the guide region 52, but can also be determined on other teeth (compare FIG. 3).

Figure 4:
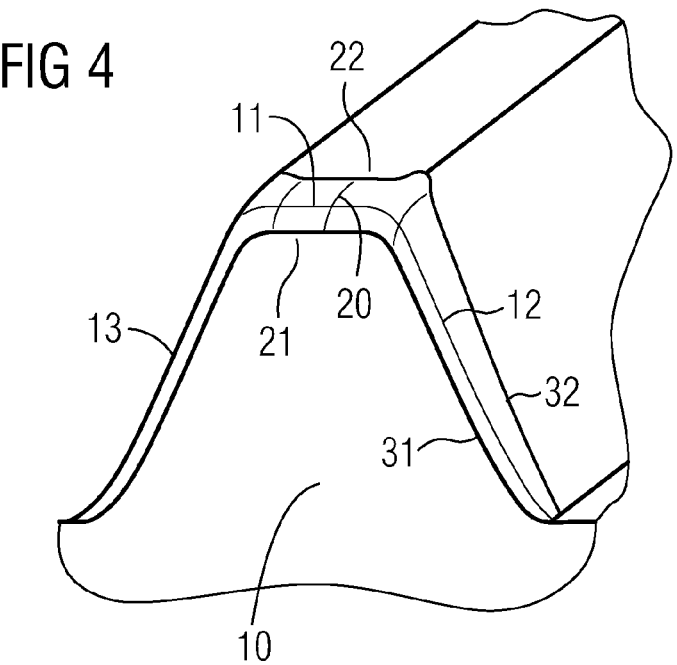
FIG. 4 shows a thread-cutting tooth in perspective view.

FIG. 4 shows an example of a thread-cutting tooth 10 rounded, according to the invention, both at the tip cutters 11 and at the flank cutters 12 and 13. A cutter rounding or cutter profile curve 20 from the tool face 21 to the tool flank 22, viewed in the middle of the tip cutter 11, is illustrated. The lines 31 and 32, which mark the start of the cutter rounding on the tool face 21 and on the tool flank 22 respectively, are also illustrated. It can be seen that the cutter rounding 20 extends substantially parallel over the tip cutter 11 with reference to the lines 31 and 32, yet that, in the cutter corner regions where the tip cutter 11 merges into the flank cutters 12 and 13, the cutter rounding becomes larger and the curvature is somewhat smaller, on the basis of the there increasing spacing of the two lines 31 and 32, so as then in the flank cutters 12 and 13 to remain approximately constant again (again almost parallel lines 31 and 32). The path of the transition lines 31 and 32 can also however be different. For instance, the lines 31 and 32 downward along the flank cutters 12 and 13 can also diverge or assume a greater spacing.

Figure 5:
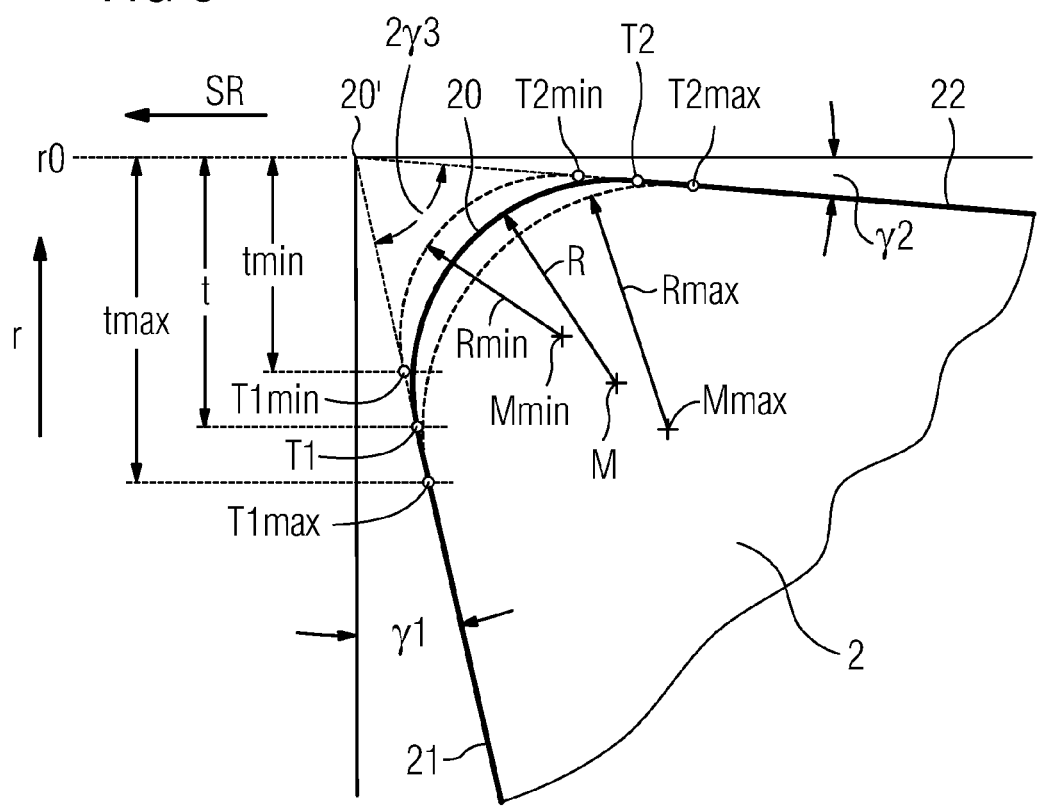

FIG. 5 now shows an example of a method for determining the radius of curvature for a substantially circular cutting edge rounding. A projection or a section through a wedge-shaped cutter 2 of a thread-cutting tooth, from its tool face 21 to its tool flank 22, is represented. The resultant cutter profile corresponds to the profile or margin of the projected cutter 2. The radius or radial distance of the rotational axis (not shown) is again denoted by r. SR is the direction of cut.

The starting basis is provided by a perfectly sharp or perfectly wedge-shaped cutter profile (ideal wedge shape), the end point 20' of which for an unrounded cutting edge is illustrated, at an outer radius r0. The wedge angle of the perfectly wedge-shaped cutter profile at the end point 20' is denoted by $2\gamma3$ and corresponds to the angle between the rectilinear profile portion of the tool face 21 or tool face of the perfectly wedge-shaped cutter profile, on the one hand, and the rectilinear profile portion of the tool flank 22 or tool flank of the perfectly wedge-shaped cutter profile, on the other hand.

A radial rounding depth t is now determined, starting from the maximum outer radius r0 radially inward or as a radial depth starting from the original outer radius r0.

At this rounding depth t, there is now applied to the tool face 21 a circle of curvature or inner tangential circle, which touches the tool face 21 at the point T1 radially situated at the radius r0−t and touches the tool flank 22 tangentially at the point T2 and has the center of curvature M. The cutting edge or cutter rounding which is rounded in accordance with this circle of curvature and runs from the point T1 on the tool face 21 to the point T2 on the tool flank, in the form of a curved cutter profile curve, is denoted by 20.

The radius of curvature R of the rounded cutting edge or cutter rounding 20, given a predefined rake angle $\gamma1$ and predefined clearance angle $\gamma2$ of the cutter 2, can be derived from the following equation as a function of the rounding depth t:

$$R = t \cdot \tan(0.5 \cdot (90° - \gamma1 - \gamma2))/\cos \gamma1 \tag{1}$$

The rounding depth t is now set so as to range between a minimum value tmin and a maximum value tmax. This produces a value range for the radius of curvature R of the rounded cutting edge or cutter rounding 20 between Rmin=R(tmin) and Rmax=R(tmax). The maximum circle of curvature having the maximum radius of curvature Rmax and the center of curvature Mmax and the contact points T1max on the tool face 21 at the depth r0−tmax and T2max on the tool flank 22, on the one hand, and the minimum circle of curvature having the minimum radius of curvature Rmin and the center of curvature Mmin and the contact points T1min on the tool face 21 at r0−tmin and T2min on the tool flank 22, on the other hand, are illustrated in dashed representation.

A value range from Rmin to Rmax is thus obtained for the radius of curvature R settable on the rounded cutting edge or cutter rounding 20.

In FIG. 6, the inventively rounded cutting edge according to FIG. 5 is additionally represented with a defined reduction depth or material removal depth a relative to the ideal wedge shape or unrounded cutting edge.

An angle bisector of the ideal wedge shape or an unrounded cutting edge is denoted by WH and runs through the end point 20' thereof, which lies on the linear edge, at the outer radius r0. The angle between the angle bisector WH and the rectilinear profile portion of the tool face 21 or tool face of the perfectly wedge-shaped cutter profile, on the one hand, and the angle between the angle bisector WH and the rectilinear profile portion of the tool flank 22 or tool flank of the perfectly wedge-shaped cutter profile, on the other hand, are equal to one another and are respectively denoted by $\gamma3$. The wedge angle of the perfectly wedge-shaped cutter profile at the end point 20' is correspondingly $2 \cdot \gamma3$ and corresponds to the angle between the rectilinear profile portion of the tool face 21 or tool face of the perfectly wedge-shaped cutter profile, on the one hand, and the rectilinear profile portion of the tool flank 22 or tool flank of the perfectly wedge-shaped cutter profile, on the other hand.

The reduction depth or material removal depth a of the rounded cutter is the distance, measured along the angle bisector WH of the ideal wedge shape, of the rounded cutter profile curve 20 from the end point 20' of the ideal wedge shape.

The rounded cutter or its cutter profile curve 20 having the center of curvature M and the radius of curvature R has the reduction depth a, the rounded cutter (illustrated in dashed representation) having the minimum radius of curvature Rmin and the center of curvature Mmin has the minimum reduction depth amin, and the rounded cutter (illustrated in dashed representation) having the maximum radius of curvature Rmax and the center of curvature Mmax has the maximum reduction depth amax. Thus amin≤a≤amax. The centers of curvature Mmin, M and Mmax all lie on the angle bisector WH.

Between the radius of curvature R and the reduction depth a, as well as the half wedge angle $\gamma3$ of the ideal wedge shape, for the represented case of a circular-line-shaped cutter 20, the following relationship can be established:

$$R = a \cdot (\tan^2 \gamma3 + \tan \gamma3 / \cos \gamma3) \tag{2}$$

In the case of the tip cutter 11, $$\gamma3 = (90° - \gamma1 - \gamma2)/2$$

with the rake angle $\gamma1$ and the clearance angle $\gamma2$.

In the case of the rear flank cutters 13 of the thread-cutting teeth 10, $$\gamma3 = (90° + \epsilon + \delta)/2$$

and in the case of the front flank cutters 12 of the thread-cutting teeth 10, $$\gamma3 = (90° - \epsilon - \delta)/2$$

with the helix angle $\epsilon$ and the pitch angle $\delta$.

The cutter profile curve 20 of the cutter 2 produces, according to FIG. 5 or FIG. 6, a circular line segment, which is most suitable for illustrating the invention. Instead of circular connecting lines between the contact points T1 and T2, however, in modifications other curve shapes too, for example ellipses, hyperbolas, parabolas, trumpet curves or curves made up of various curve portions, etc. with variable radius of curvature, can be put into the cutter 2 between the tool face 21 and the tool flank 22 in symmetrical or asymmetrical form relative to the angle bisector WH. Nor does the transition between the cutter profile curve 20 and the tool face 21, as well as the tool flank 22, have to be tangential or smooth, but can also be made under an edge or corner or similar.

In the case of a function or geometry of the cutter profile curve 20 other than the aforementioned circularity, a different correlation between the then no longer constant radius of curvature R and the reduction depth a, as well as the half wedge angle γ3, is obtained, which relation can generally be described by the following, more general equation:

$$R=R(a,\gamma 3) \qquad (3)$$

In most cases, a simpler equation $$R=a\cdot f(\gamma 3) \qquad (4)$$

can however be used, in which therefore, the radius of curvature R corresponds to the product of the reduction depth a and a general function f(γ3) of the (half) wedge angle γ3.

The cutter rounding 20 and its curvature, in particular the value range for the radius of curvature R and its limits Rmin and Rmax, and/or the reduction depth a, in particular the value range for the reduction depth a between amin and amax, are or is chosen as a function of or in dependence on, in particular, the following parameters:
  lead form
  chamfer diameter
  thread diameter
  thread pitch angle δ or the thread pitch P
  chip groove number
  side rake angle or helix angle ε
  rake angle
  clearance angle
  material to be machined
  material of the thread-cutting teeth.

Preferably, the radius of curvature R and the reduction depth a of the cutter profile curve 20 are chosen in dependence, at least, on the following three parameters:
  rise or increase in the maximum radial distance of the outer cutters or tip cutters of the thread-cutting teeth (or: of the thread cutters shaped according to the thread profile) over the lead region in accordance with the path of the radial distance function r(z) in the lead region, in the represented illustrative embodiment therefore from r(0) at z=0 to r0=r(z0) at z=z0 with the difference Δr=r0−r1 or, equivalently, of the chamfer length La given a predefined lead or lead taper angle,
  number Z of thread-cutting teeth in the lead region, and
  thread pitch P or thread pitch angle δ

According to the invention, the following empirically found (linear) relationship for the reduction depth a as a function of the thread pitch P and the number Z of lead teeth is now drawn upon:

$$a=C\cdot P/Z \qquad (5)$$

with the real number or constant C, which according to the invention is chosen from the following range:

$$0.0075 \leq C \leq 0.7383 \qquad (6)$$

preferably from the range $$0.0664 \leq C \leq 0.3692 \qquad (7).$$

In the constant C according to (4) and (5) or (4) and (6), in the present illustrative embodiment the dependence of the reduction depth a on the radial increase Δr in the lead region 51 is also taken into account, for Δr is here proportional to the thread pitch P.

In the case of a complicated radial distance function r(z), yet another dependence of the reduction depth a on the radius r(z) can be obtained.

The radius of curvature R is obtained from the reduction depth a through the use of (5) together with (6) or (7) in (2), (3) or (4).

The thread-cutting teeth of the screw tap can also be provided with roundings in the outer region between thread tip cutters and flank cutters and also on the land (rear side of the groove), for instance for a backward cut following reversal of the direction of rotation.

The thread-cutting region, in particular 50, can be configured in one piece with the shank 53, for example in VHM construction, or can even be connected as a separate part to the shank 53 (VHM or KHM). In addition, prefabricated parts with thread-cutting teeth, for example 10 in the form of strips or similar, can also be attached to the shank 53, in particular soldered on, clamped or screwed on.

The screw tap, in particular 5, can further be coated with a hard coating or wear-resistant coating or friction-reducing coating which is known per se, for example with TiN; TiCN, TiALN, AlCrN or WC/C, etc.

In addition, the thread-cutting region, in particular 50, or at least the cutters or thread-cutting teeth 11, can also be formed from a different hard material, for instance polycrystalline diamond (PCD), cubic boron nitride (CBN), corundum, a metal boride, in particular magnesium boride, or a metal boride carbide, in particular magnesium boride carbide, or even from a non-hard material such as, for example, heavy duty high-speed steel HSS.

In the screw tap according to the invention, a shank tolerance h6 is sufficient, but h9, for example, can also be used. In addition, an internal coolant and/or lubricant supply via channels in the screw tap can be provided, in particular with radial and/or axial discharge.

REFERENCE NUMERALS 2 cutter
5 screw tap
10 thread-cutting tooth
11 tip cutter
12, 12 flank cutter
20 cutter rounding
20' unrounded cutting edge
21 tool face
22 tool flank
45 chip groove
50 thread-cutting region
51 lead region
52 guide region
53 shank
54 squared end
55 end
A rotational axis
r radial distance
r0 outer radius
SR direction of cut
P thread pitch
La chamfer length
E1, E2, E3 plane of projection
P1, P2, P3 measuring site
t, tmin, tmax rounding depth
M, Mmin, Mmax center of curvature
R, Rmin, Rmax radius of curvature
T1, T2 contact point
T1min, T2min contact point T1max, T2max contact point
ε side rake angle
γ1 rake angle
γ2 clearance angle
γ3 half wedge angle
a, amin, amax reduction depth
W angle bisector

We claim:

1. A set of screw taps, each of which is rotatable about a rotational axis, comprising:
   two or more screw taps, each comprising:
   a plurality of thread-cutting teeth, which respectively have a radially outer tip cutter and are disposed mutually offset, with a predefined thread pitch, in an arrangement running spirally or helically around the rotational axis;
   wherein, in a lead region adjoining one end of the screw tap axially to the rotational axis, the maximum radial distance of the tip cutters of the thread-cutting teeth from the rotational axis increases with increasing axial distance of the tip cutters from one end of the screw tap according to a predefined radial distance function;
   wherein radially is defined as perpendicular to the rotational axis and axially is defined as along or parallel to the rotational axis;
   wherein at least some of the thread-cutting teeth in the lead region respectively have a defined cutter rounding between tool face and tool flank comprising an outer surface that is separated from an ideal wedge shape by a reduction depth, wherein the ideal wedge shape is an unrounded cutting edge defined by an end point of lines extending from tool face and tool flank, and wherein the reduction depths are respectively chosen based on:
   1) the number of thread-cutting teeth in the lead region; and
   2) the thread pitch;
   wherein the reduction depths of the cutter roundings of at least some of the thread-cutting teeth in the lead region are directly proportional to the thread pitch and inversely proportional to the number of thread-cutting teeth in the lead region.

2. The set of screw taps as claimed in claim 1, wherein, for at least one of the two or more screw taps, the radii of curvature of the cutter roundings and the reduction depths of the cutter roundings of the thread-cutting teeth in the lead region of each screw tap are respectively, at least on average, smaller, if, at least one of:
   given the same thread pitch, the number of thread-cutting teeth in the lead region is increased from a first number of thread-cutting teeth to a second, greater number of thread-cutting teeth;
   given the same radial distance function, the number of thread-cutting teeth in the lead region is increased from a first number of thread-cutting teeth to a second, greater number of thread-cutting teeth;
   given the same number of thread-cutting teeth in the lead region, the increase in the maximum radial distance over the whole of the lead region according to the radial distance function is reduced from a first increase in the maximum radial distance to a second, smaller increase in the maximum radial distance;
   given the same thread pitch, the increase in the maximum radial distance over the whole of the lead region according to the radial distance function is reduced from a first increase in the maximum radial distance to a second, smaller increase in the maximum radial distance;
   given the same radial distance function, the thread pitch is reduced from a first thread pitch to a second, smaller thread pitch; and
   given the same number of thread-cutting teeth in the lead region, the thread pitch is reduced from a first thread pitch to a second, smaller thread pitch.

3. The set of screw taps as claimed in claim 1, wherein, for at least one of the two or more screw taps, at least one of:
   the radial distance function of the thread cutters in the lead region is monotonically growing;
   the radial distance function for the maximum radial distance of the tip cutters is a linear function of the axial distance from the end of the screw tap; and
   the radial distance function for the maximum radial distance of the tip cutters is a step or staircase function of the axial distance from the end of the screw tap.

4. The set of screw taps as claimed in claim 1, at least one of the two or more screw taps further comprising:
   a guide region which follows axially upon the lead region and into which the arrangement of thread-cutting teeth extends and in which the maximum radial distance of the tip cutters of the thread-cutting teeth no longer increases with increasing axial distance from one end of the screw tap or remains the same and then slightly decreases again,
   wherein at least some of the thread-cutting teeth in the guide region, at least in the region of the tip cutters, respectively have a defined cutter rounding, wherein the cutter roundings have defined curvatures and defined reduction depths, wherein the curvatures of the cutter roundings and the reduction depths of the cutter roundings are respectively chosen based on the thread pitch of the thread-cutting teeth.

5. The set of screw taps as claimed in claim 1, wherein for at least one of the two or more screw taps, radii of curvature of the cutter roundings are variable or lie within a range from at least one of 2 μm to 200 μm.

6. The set of screw taps as claimed in claim 1, wherein, for at least one of the two or more screw taps, at least one of:
   the cutter roundings of the thread-cutting teeth are formed with curved cutter profile curves between tool face and tool flank;
   at least one cutter rounding or at least one cutter profile curve runs, at least in sections, along a circle of curvature or in a circular arc having, at least in sections, a substantially constant curvature or radius of curvature;
   at least one cutter rounding or at least one cutter profile curve has, at least in sections, substantially a non-circular-arc-shaped course; and
   at least one cutter rounding or at least one cutter profile curve has a curvature or radius of curvature which, at least in sections, is substantially variable or non-constant, wherein at least one of:
   the curvature of at least one cutter rounding or of at least one cutter profile curve increases from the tool face to the tool flank;
   the curvature of at least one cutter rounding or of at least one cutter profile curve decreases from the tool face to the tool flank;
   the curvature of at least one cutter rounding or of at least one cutter profile curve increases from the tool face to the tool flank up to a maximum, and then decreases again;
   the curvature of at least one cutter rounding or of at least one cutter profile curve decreases from the tool face to the tool flank up to a minimum and then increases again; and
   in a central region of the tip cutters, the curvature of the cutter rounding is provided, and in transition regions to the flank regions or cutting corners of the thread-cutting teeth, an edge shape without curvature is provided.

7. The set of screw taps as claimed in claim 1, in which the cutter rounding of at least one of the two or more screw taps merges into at least one of the tool face and the tool flank of the corresponding cutter in one or more of a tangential and a smooth manner.

8. The set of screw taps as claimed in claim 1, in which, for at least one of the two or more screw taps:
the curvature or radius of curvature of the cutter rounding is determined at least in part by a rounding or reduction depth; and
the curvatures of the cutter roundings or cutter profile curves and the reduction depths of the cutter roundings are chosen based on the thread diameter.

9. The set of screw taps as claimed in claim 1, in which, for at least one of the two or more screw taps, the curvatures of the cutter roundings or cutter profile curves and the reduction depths of the cutter roundings are based on one or more of:
a rake angle of the tool face;
a clearance angle of the tool flank;
a wedge angle of the ideal wedge shape;
a side rake angle of the cutters;
a material in which the thread is to be produced;
a material of the thread-cutting teeth;
a structure of a material of the thread-cutting teeth; and
a hardness of a material of the thread-cutting teeth.

10. The set of screw taps as claimed in claim 1, at least one of the two or more screw taps further comprising one or more of:
at least two chip grooves, which run parallel or axially to the rotational axis;
at least two chip grooves, which run around the rotational axis with a constant helix angle; and
at least two chip grooves, which run around the rotational axis with a variable helix angle,
wherein on each chip groove there is respectively disposed a plurality of axially offset thread-cutting teeth, and
wherein the curvatures of the cutter roundings or cutter profile curves and the reduction depths of the cutter roundings are based on at least one of the number of chip grooves and the helix angle of the chip grooves.

11. The set of screw taps as claimed in claim 1, wherein, for at least one of the two or more screw taps, at least the thread-cutting teeth, at least on the tip cutters, are formed from at least one of a hard metal, a metal carbide, a brittle, hard material, polycrystalline diamond (PCD), cubic boron nitride (CBN), corundum, a metal boride, a magnesium boride, a metal boride carbide, and a magnesium boride carbide.

12. The set of screw taps as claimed in claim 1, wherein the two or more screw taps, and the curvatures of the cutting edge roundings of at least some of the thread-cutting teeth in the lead region, at least in the region of the tip cutters, of the two or more screw taps, differ in terms of one or more of:
the number of thread-cutting teeth in the lead region;
the increase in the maximum radial distance of the tip cutters of the thread-cutting teeth in the lead region;
the increase of the radial distance function of the thread-cutting teeth in the lead region; and
the thread pitch.

13. The set of screw taps as claimed in claim 1, wherein, for at least one of the two or more screw taps, the curvatures of the cutter roundings and reduction depths of the cutter roundings compared to the ideal wedge shape or to the unrounded cutting edge, are respectively chosen based on the increase in the maximum radial distance of the tip cutters of the thread-cutting teeth in the lead region or the radial distance function of the thread-cutting teeth in the lead region.

14. A method for the production of screw taps, which are rotatable about a rotational axis, comprising:
a) producing, for each screw tap, an associated number of thread-cutting teeth, wherein each of the thread-cutting teeth respectively has a radially outer tip cutter and are disposed mutually offset, with a predefined thread pitch, in an arrangement running spirally or helically around the rotational axis;
b) wherein, in a lead region adjoining one end of the screw tap axially to the rotational axis, the maximum radial distance of the tip cutters of the thread-cutting teeth from the rotational axis increases with increasing axial distance of the tip cutters from one end of the screw tap, according to a predefined radial distance function,
c) wherein radial is defined as perpendicular to the rotational axis and axial is defined as along or parallel to the rotational axis,
d) wherein at least some of the thread-cutting teeth in the lead region respectively have a defined cutter rounding between tool face and tool flank comprising an outer surface that is separated from an ideal wedge shape by a reduction depth, wherein the ideal wedge shape is an unrounded cutting edge defined by an end point of intersecting lines extending from tool face and tool flank, and wherein the curvatures of the cutting edge roundings and the reduction depths are respectively chosen based on:
d1) the number of thread-cutting teeth in the lead region;
d2) the thread pitch; and
d3) the increase in the maximum radial distance of the tip cutters of the thread-cutting teeth in the lead region, or the radial distance function of the thread-cutting teeth in the lead region of the respective screw tap.

15. The method as claimed in claim 14, wherein:
the thread-cutting teeth are produced with as yet unrounded cutting edges by grinding; and
for the rounding of the cutting edges of the thread-cutting teeth, at least one of a mechanical fine metal-removing method, a jet-grinding method, a jet-machining method with abrasive material, a brushing method, and a high-pressure water jet method, is used.

16. A set of screw taps, comprising:
two or more screw taps, each of which is rotatable about a rotational axis, and is configured with one or more rounded teeth, wherein the rounding of each tooth is configured to minimize wear and to otherwise maximize the life of the screw tap, each of the screw taps comprising:
a plurality of thread-cutting teeth, which respectively have a radially outer tip cutter and are disposed mutually offset, with a predefined thread pitch, in an arrangement running spirally or helically around the rotational axis;
wherein, in a lead region adjoining one end of the screw tap axially to the rotational axis, the maximum radial distance of the tip cutters of the thread-cutting teeth from the rotational axis increases with increasing axial distance of the tip cutters from a free end or tip of the screw tap;
wherein at least some of the thread-cutting teeth in the lead region are curved relative to an ideal wedge shape having an outer edge defined as an end point of intersecting lines extending from tool face and tool flank, such that a distance from the intersection to the outer edge comprises a reduction depth, and wherein the reduction depth and curvature of the outer edge depend on:

1) the number of thread-cutting teeth in the lead region; and
2) the thread pitch;
wherein the reduction depths of the cutter roundings of at least some of the thread-cutting teeth in the lead region are directly proportional to the thread pitch and inversely proportional to the number of thread-cutting teeth in the lead region,
wherein the curvatures of the cutter roundings and reduction depths of the cutter roundings are chosen, in comparison to the ideal wedge shape, respectively based on the increase in the maximum radial distance of the tip cutters of the thread-cutting teeth in the lead region.

17. The set of screw taps as recited in claim 16, wherein, for at least one of the two or more screw taps, the radii of curvature of the cutter roundings and the reduction depths of the cutter roundings of the thread-cutting teeth in the lead region are respectively, at least on average, smaller, if, given the same thread pitch and given the same radial distance function, the number of thread-cutting teeth in the lead region is increased from a first number of thread-cutting teeth to a second, greater, number of thread-cutting teeth.

18. The set of screws tap as recited in claim 16, wherein, for at least one of the two or more screw taps, the radii of curvature of the cutter roundings and the reduction depths of the cutter roundings of the thread-cutting teeth are respectively, at least on average, smaller, if, given the same number of thread-cutting teeth in the lead region and given the same thread pitch, the increase in the maximum radial distance over the whole of the lead region according to the radial distance function is reduced from a first increase in the maximum radial distance to a second, smaller increase in the maximum radial distance.

19. The set of screw taps as recited in claim 16, wherein, for at least one of the two or more screw taps, the radii of curvature of the cutter roundings and the reduction depths of the cutter roundings of the thread-cutting teeth in the lead region are, at least on average, smaller, if, given the same radial distance function and given the same number of thread-cutting teeth in the lead region, the thread pitch is reduced from a first thread pitch to a second, smaller thread pitch.

* * * * *